US006177385B1

United States Patent
Nimerick (10) Patent No.: US 6,177,385 B1
(45) Date of Patent: *Jan. 23, 2001

(54) METAL ION CROSSLINKED FRACTURING FLUID AND METHOD

(75) Inventor: Kenneth H. Nimerick, Tulsa, OK (US)

(73) Assignee: Schlumberger Technology Corporation, Sugar Land, TX (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/534,357

(22) Filed: Sep. 27, 1995

Related U.S. Application Data (63) Continuation of application No. 08/283,129, filed on Jul. 29, 1994, now Pat. No. 5,681,796.

(51) Int. Cl.$^7$ .............................. C09K 3/00; E21B 43/17
(52) U.S. Cl. ..................... 507/209; 507/273; 507/922; 507/276; 507/277; 166/308
(58) Field of Search ..................... 507/922, 217, 507/211, 209, 271, 273, 276, 277; 166/308

(56) References Cited

U.S. PATENT DOCUMENTS

| | | | | |
|---|---|---|---|---|
| 3,079,332 | * | 2/1963 | Wyant | 166/283 |
| 3,202,214 | * | 8/1965 | McLaughlin | 166/292 |

(List continued on next page.)

OTHER PUBLICATIONS

Proceedings of the Twenty–Second Annual Southwestern Petroleum Short Course, Texas Tech University, Apr. 17–18, 1975, Lubbock, Texas.
Proceedings of the Twenty–Seventh Annual Southwestern Petroleum Short Course, Texas Tech University, Apr. 17–18, 1980, Lubbock, Texas.
SPE 21034 "Field Application of Laboratory Friction Pressure Correlations for Borate Crosslinked Fluids", H.C. Tan and S. Shah, Halliburton Services, paper presented Feb. 20–22,1991, Anaheim, Calif.
Chemistry and Rheology of Borate–Crosslinked Fluids at Temperatures to 300° F., Phillip C. Harris, SPE, Halliburton Services, Mar. 1993·JPT.
New Frac Fluid Enhances Options for Offshore Wells, hoang Le and Russell Wood, BJ Services R&D & Tech Services, Tomball, Texas, Oceanindustry, Mar. 1992.

* cited by examiner

*Primary Examiner*—Philip Tucker
(74) *Attorney, Agent, or Firm*—Gordon G. Waggett; Robin C. Nava (57) ABSTRACT

A fracturing fluid and method is disclosed comprising an aqueous metal hydrated galactomannan gum, buffered to a pH of from about 9 to about 11, and using reduced amounts galactomannan gum. Further, the invention provides a metal ion source, such as borate, to crosslink the galactomannan gum polymer in subterranean fractures. In one embodiment a slowly dissolving slurried borate is used in pumping an alkaline fracturing fluid into a subterranean formation to increase production of hydrocarbons. In another embodiment, an encapsulated borate source is used. A chemical stabilizer optionally may be used.

30 Claims, 4 Drawing Sheets

U.S. PATENT DOCUMENTS

| | | | | |
|---|---|---|---|---|
| 3,208,524 | * | 9/1965 | Horner | 166/294 |
| 3,215,634 | * | 11/1965 | Walker | 252/311 |
| 3,346,556 | * | 10/1967 | Foster | 536/32 |
| 3,411,580 | * | 11/1968 | McKinney et al. | 166/285 |
| 3,625,286 | * | 12/1971 | Parker | 166/292 X |
| 3,740,360 | * | 6/1973 | Nimerick | 523/131 |
| 3,766,984 | * | 10/1973 | Nimerick | 166/294 |
| 3,898,165 | * | 8/1975 | Ely et al. | 507/210 |
| 3,974,077 | * | 8/1976 | Free | 507/211 |
| 4,514,309 | * | 4/1985 | Wadhwa | 507/211 |
| 4,579,670 | * | 4/1986 | Payne | 507/211 |
| 4,619,776 | * | 10/1986 | Mondshine | 507/211 |
| 4,969,526 | * | 11/1990 | Cawiezel | 166/300 |
| 4,997,487 | * | 3/1991 | Vinson et al. | 106/804 |
| 5,036,919 | | 8/1991 | Thomas et al. . | |
| 5,082,579 | * | 1/1992 | Dawson | 507/203 |
| 5,103,905 | | 4/1992 | Brannon et al. . | |
| 5,103,913 | | 4/1992 | Nimerick et al. . | |
| 5,145,590 | * | 9/1992 | Dawson | 507/211 |
| 5,160,445 | * | 11/1992 | Sharif | 507/203 |
| 5,160,643 | * | 11/1992 | Dawson | 507/211 |
| 5,165,479 | | 11/1992 | Harris et al. . | |
| 5,211,859 | * | 5/1993 | Horton | 507/211 |
| 5,252,234 | | 10/1993 | Sharif . | |
| 5,252,235 | | 10/1993 | Sharif . | |
| 5,252,236 | | 10/1993 | Sharif . | |
| 5,252,239 | * | 10/1993 | Sharif | 252/75 |
| 5,259,455 | * | 11/1993 | Nimerick et al. | 166/308 |
| 5,266,224 | | 11/1993 | Sharif . | |
| 5,271,466 | * | 12/1993 | Harms | 166/300 |
| 5,310,489 | * | 5/1994 | Sharif | 507/203 |
| 5,330,005 | | 7/1994 | Card et al. . | |
| 5,372,732 | * | 12/1994 | Harris et al. | 507/217 |
| 5,393,439 | * | 2/1995 | Laramay et al. | 507/211 |
| 5,445,223 | * | 8/1995 | Nelson et al. | 166/308 |
| 5,460,226 | * | 10/1995 | Lawson et al. | 166/300 |

FIG. 3   YF115LGB-060195B at 100. SEC$^{-1}$ ON FANN-50 #2

FIG. 4   YF125LGS-060995B at 100. SEC$^{-1}$ ON FANN-50 #2

METAL ION CROSSLINKED FRACTURING FLUID AND METHOD

CROSS REFERENCE TO RELATED APPLICATIONS

This patent application is a continuation in part of U.S. application Ser. No. 08/283,129 which was filed on Jul. 29, 1994 now U.S. Pat. No. 5,681,796.

BACKGROUND OF THE INVENTION

In the process of producing oil and gas, it is common practice to treat a hydrocarbon-bearing formation with a pressurized fluid to provide flow channels, thereby fracturing the formation. This treatment usually comprises pumping the fluid down the wellbore to cause fissures or fractures in the subterranean rock strata, facilitating greater production of hydrocarbons.

Fluids also are used to control the undesirable production of sand, thereby facilitating flow of hydrocarbons to the wellbore. Well treatment fluids, particularly those used in fracturing, comprise a water or oil based composition incorporating a thickening agent. In many cases, the thickening agent is a polymeric material.

The thickening agent assists in controlling leak-off of the fluid into the formation, and it aids in the transfer of hydraulic fracturing pressure to the rock surfaces. Primarily, however, the thickening agent facilitates the suspension and transfer into the formation of proppant materials that remain in the formation fracture or sand zone when the hydraulic pressure is released, thereby holding the fracture open in the first instance, or stabilizing the sand in the latter instance.

Polymeric thickening agents useful in such fluids are galactomannan gums such as guar and substituted guars such as hydroxypropyl guar and carboxymethylhydroxypropyl guar. Cellulosic polymers such as hydroxyethyl cellulose may be employed, as well as synthetic polymers such as polyacrylamide. Crosslinking of the polymeric materials is employed to increase the viscosity and proppant carrying ability of the fracturing fluid, as well as to increase its high temperature stability. Typical crosslinking agents comprise soluble boron, zirconium, and titanium compounds.

Well treatment fluids are prepared on the surface and then pumped through tubing in the wellbore to the hydrocarbon-bearing subterranean formation. High viscosity, thickened fluid is highly desirable underground within the formation in order to transfer hydraulic pressure efficiently to the rock, resulting in efficient energy transfer to form fractures in the oil producing formation. Also, high viscosity of the treatment fluid assists in reducing fluid leak-off into the formation. However, large amounts of energy are required to pump such thickened fluids through the tubing into the formation. To reduce the amount of energy required in such pumping operations, various methods of delaying crosslinking of the fluid have been developed. By delaying crosslinking, the fluid may be pumped while in a relatively "thin" state, and then used for fracturing after it has "thickened". These techniques allow the pumping of a relatively less viscous fluid having relatively low friction pressures within the well tubing. Later, at the appropriate place and time, crosslinking of the fluid is accomplished at a location near or within the formation. In this way, the advantageous properties of thickened crosslinked fluid are available at the rock face, while at the same time conserving energy during pumping operations.

One typical delayed crosslinking well treatment fluid system comprises borate crosslinked galactomannan gums such as guar or hydroxypropyl guar. The galactomannan polymers, which may be provided as a solid or as a suspension in a hydrocarbon, hydrate in neutral or acidic solution to form a gel. Under these conditions, i.e., pH of 7 or lower, no crosslinking of guar or hydroxypropyl guar will occur with borate ion. To effect borate crosslinking of guar and hydroxypropyl guar, the pH must be raised to at least 9.0. The requirement to raise the pH to this alkaline level is used to delay the crosslinking of the galactomannan gums by the borate ion. Thus at least one difficulty in such methods is that the pH must be made alkaline at precisely the correct stage of the pumping operation to effect crosslinking at the appropriate time.

The practice of delaying crosslinking of thickening agents in such fluids, however, presents other difficulties. Sophisticated techniques must be employed to adjust the pH of the fluid at the proper location, i.e., in or near the formation. U.S. Pat. No. 5,259,455, for example, describes the practice of controlled dissolution of MgO in a fracturing fluid to provide such pH adjustment. Operating effectively where formation temperatures are above 200° F., the patent discloses additives to prevent the magnesium precipitation which would lower the pH of the system. The problems with such systems include the fact that at high use concentrations other precipates are formed which may reduce fracture conductivity.

An alternative approach to the problem of adequately and in a timely manner accomplishing downhole pH adjustment is to reduce the concentration of the galactomannan thickening agent in the well treatment fluid. At such reduced concentrations, also known as "reduced loadings", it is sometimes possible to accomplish crosslinking earlier, or with only a slight amount of delay. In some cases, the reduced loading reduces the friction of pumping the fluid, making the delay of crosslinking less of a significant factor than it might otherwise be in such pumping operations.

Reduction of the galactomannan thickening agent concentration (i.e., use of a low polymer loading) in such fluids, however, has not been practiced to any significant extent because of a long-established belief by those skilled in the art that certain threshold minimum levels of polymer loading of the thickening agents are required for effective or sufficient crosslinking. Conventional wisdom has dictated that the subterranean formation will not adequately fracture or fissure unless a certain minimum threshold of polymer is available to crosslink within the fracture. Also, in the past it has been believed that certain levels of polymer were necessary to provide the viscosity necessary to carry the proppant into the fracture.

In the case of the polymer guar, for example, this threshold concentration has been considered to be about 17 pounds of guar per one thousand gallons of aqueous fracturing fluid. This belief in the art was based upon studies of the radius of gyration of the guar molecule and the theory that if the radius of gyration of two molecules in solution do not overlap, the molecules cannot provide crosslinking in sufficiently great numbers to produce an adequately crosslinked gel as required for reliable fracturing operations.

As a general proposition, well treatment solutions employed in the field utilizing crosslinking of the thickening agent, prior to this invention, customarily utilized concentrations of delayed crosslinking thickening agents that are well above the level previously mentioned-typically in the range of at least 30 pounds of polymer per 1000 gallons of liquid.

Furthermore, other prior art fracturing methods have employed relatively simple buffers to delay crosslinking by producing an acidic pH in the fluid. Acidic pH is required in these prior art methods because it is necessary to maintain such an acidic pH to facilitate the dissolution of the relatively larger concentration of galactomannan gum in the fluid. Such systems typically have been employed at the relatively large polymer loadings mentioned previously. At such loadings, acidic pH is employed in the fluid at the surface (prior to pumping downhole) to solubilize the galactomannan gum.

It has been necessary in the past using certain prior art systems to employ both: (1) a buffer to produce acidic pH, and (2) a delayed action basic compound which acts override the effect of the buffer during pumping, allowing for a gradual rise in pH from acidic levels (below 7) to basic or alkaline conditions (above 7) during pumping of the fluid downhole into the subterranean formation. In this way, slow dissolution of a delayed action compound was used to regulate crosslinking of polymer in such systems.

The disadvantages of using only the slow dissolution method during pumping downhole to regulate crosslinking in such systems are numerous. For example, precise regulation of the pH downhole using such systems is not possible. The adjustment of the pH by slowly soluble sources of delayed action basic compounds is not precise, and errors in pH adjustment are common.

There is not a satisfactory method to monitor and adjust the pH once the fluid is pumped downhole, and in such systems, the passage of time is the controlling factor regulating the dissolution of the delayed action basic compound. Time is a variable that cannot be independently controlled and regulated from the surface, and the operator of such fracturing systems cannot readily change the rate of dissolution of the delayed action basic compound once the fluid is pumped downhole. Thus, slow dissolution of delayed action basic compounds may pose pH problems when used as a method of regulating crosslinking.

Furthermore, soluble borate sources tend to limit the maximum operating temperature of fluids because syneresis of such fluids occurs at low temperatures where pH is greatest. Conventional borate salts and similar compounds are limited as to the maximum temperature that can be achieved. There has been a recognized need for a borate source that will facilitate a longer delay time, thereby allowing pumping into deeper and hotter wells. The fracturing industry needs a crosslinking system that can overcome the inherent limitations of borate sources that limit the maximum operating temperature of the fluid.

A need has existed for a borate source that minimizes the available boron concentration in solution while the fluid is at the surface, thereby facilitating a higher total concentration of boron source in the fluid. In such systems, sufficient amounts of the borate are masked such that most of the borate only becomes available for crosslinking at the higher temperatures found downhole. Unfortunately, soluble borate sources in such fluid systems are limited to maximum temperatures above which they cannot operate effectively. This maximum temperature has been in the range of about 175–200° F.

What has been needed in the industry is a fracturing fluid that does not exhibit syneresis at the surface, but still provides good viscosity at temperatures up to 250° F., or even higher.

It would be desirable to provide a well treatment fluid, especially a fracturing fluid, that exhibits relatively low friction loss in the well tubing, while avoiding the difficulties associated with raising the pH at the proper time or downhole location. Additionally, there has been a search for a system that further avoids difficulties associated with insufficient crosslinking of the polymer at low levels of polymer loading.

There has existed a need in this industry for an effective fluid having reduced concentrations of galactomannan gum polymer, thereby reducing the costs of such solutions and improving the conductivity of oil and gas produced from the formations after fracture treatment. It has been recognized as desirable to devise a method characterized by use of a low cost fracturing fluid that is not dependent on precision pH adjustment downhole, wherein the fluid uses reduced polymer loadings while still sufficiently crosslinking the polymer to adequately fracture the formation, especially at high temperatures. In particular, such a system that also incorporates an improved borate dissolution would be desirable. This invention is designed to meet these and other needs as set forth below.

SUMMARY OF THE INVENTION

This invention is a fluid and method for fracturing subterranean formations in which an alkaline fluid containing a metal ion source is used to crosslink a galactomannan gum to increase the production of hydrocarbons from the formation. Further, the concentration level of galactomannan gum may be at reduced levels, and a borate source may be employed whereby the borate source slowly increases in concentration, and therefore increases its availability for crosslinking, during pumping and utilization of the fracturing fluid.

Reducing the level of galactomannan gum, while still achieving adequate crosslinking, is one advantage of this invention. The borate source preferably-is of the slow dissolution type, and may be used in its customary form or in the encapsulated state.

Surprisingly, it has been found that the hydrated galactomannan gum of a fracturing fluid containing reduced amounts of galactomannan gum may be crosslinked by a suitable metal crosslinking agent if appropriate buffering of the fluid is provided. Furthermore, it has been found that a delayed action basic compound is not necessary where one does not begin initially with an acidic fluid, but instead employs an alkaline fluid at the onset of pumping. Higher fracturing temperatures in deeper wells may be attained by using fluids of this invention, including borate sources that are slowly soluble or are encapsulated.

This invention is a novel fluid and method of fracturing. It generally comprises an aqueous hydrated galactomannan gum and a buffering agent of a weak acid and a salt of said weak acid. The agent is provided in amounts sufficient to provide a controlled alkaline pH of from about 9 to about 11 in the fluid. The fluid further contains a metal ion source capable of furnishing metal ions in solution for crosslinking said galactomannan gum, and the well treating fluid is effective at reduced concentration levels of galactomannan gum comprising from about 10 to about 40 pounds of aqueous hydrated galactomannan gum per 1000 gallons of fluid.

The fluid is effective to delay release of metal ions while facilitating a sufficiently elevated concentration level of metal ions to allow the effective use of the fluid at temperatures in excess of 175° F.

Moreover, it has been found that buffered, low concentration hydrated metal crosslinked galactomannan gum thickened fluids according to the invention are effective well treatment fluids that are easily transported down into a well with significant energy savings. This buffered fluid may be maintained at alkaline pH on the surface prior to pumping, and without the necessity for an acidic pH in the fluid. Accordingly, in one embodiment, the invention relates to a novel well treatment fluid composition comprising an aqueous hydrated metal crosslinked galactomannan gum solution buffered to an alkaline pH of from about 9.0 to about 11. More particularly, the invention relates to a well treatment fluid of the galactomannan gum type which is buffered by the addition of or which contains a selected buffering agent or agents in a concentration sufficient to provide or maintain a pH in the solution or fluid of from about 9.0 to about 11. The invention may be utilized at reduced polymer loadings, thereby providing viscosity advantages.

In a preferred embodiment, the invention relates to a well treatment or fracturing fluid of the type described wherein the buffering agent comprises a weak acid and an ammonium or alkali metal salt of a weak acid, the acid and salt being selected to provide a pH of the fluid between 9 and 11. The invention also comprises a fracturing fluid composition of an aqueous hydrated borate crosslinked galactomannan gum solution containing a buffering agent, the buffering agent being present in the solution in an amount sufficient to provide the fluid with a pH of from about 9 to about 11.

As used herein, the term "well treatment" refers generally to operations undertaken with respect to a well and formation, including, but not limited to, fracturing and sand control. "Galactomannan gum" is understood to include mixtures of such gums.

In a further embodiment of the invention, the invention relates to a method of treating a subterranean formation penetrated by a borehole, comprising injecting into the borehole and into contact with the formation, at a rate and pressure sufficient to treat the formation, a fluid composition comprising an aqueous hydrated metal crosslinked galactomannan gum solution buffered to a pH of from about 9 to about 11. Preferably, the fluid is injected at a pressure sufficient to fracture the formation. More particularly, the invention relates to a method of treating or fracturing characterized by use of a fluid of the galactomannan gum type wherein the buffering agent comprises a weak acid and an ammonium or alkali metal salt of a weak acid, the acid and salt being selected to provide a pH of the fluid of solution between about 9 and about 11. The galactomannan gum may be borate crosslinked, and an alkaline buffering agent is present in the solution in an amount sufficient to provide or maintain the fluid with a pH of from about 9 to about 11.

DETAILED DESCRIPTION OF THE INVENTION

The fluid compositions of this invention comprises an aqueous hydrated metal crosslinked galactomannan gum solution. Preferred solutions are those derived from guar, hydroxypropyl guar, or carboxymethylhydroxypropyl guar, and mixtures thereof. Initially, the hydrated metal gum solutions may be formed by providing the gum compositions in solid powder form, or as a suspension in a hydrocarbon liquid (e.g., diesel or kerosene) and blending with an aqueous solution, the hydrate forming a gel of neutral or basic pH prior to pumping downhole. Further, it is sometimes desirable to provide slowly soluble, or even encapsulated metal ions, as the metal ion source.

It is a surprising advantage of the invention that reduced concentrations of the hydrated crosslinked gum may be employed in the fluid. Preferably, the concentration of the hydrated metal crosslinked gum will be at or below 40 pounds per 1000 gallons, being most preferably from about 15 pounds to 30 pounds per 1000 gallons, it being understood that higher amounts may be employed. Superior advantages accrue at levels of galactomannan gum at about 10 to 22 pounds per 1000 gallons of fluid.

Another significant advantage of this invention is that higher temperature and deeper wells may be serviced by the fluid. This is due in part to the fact that the fluid is rheologically functional (i.e. has sufficient viscosity) at temperatures over 175° F. for several hours. In some cases, improved performance is seen at temperatures as high as 250° F., or higher. Further, by using borate slurries it is sometimes possible to allow the use of higher borate concentrations without undesirably overcrosslinking at the surface. Also, crosslinking delay may reduce friction pressure that becomes a more significant factor at greater wells depths (and higher temperatures).

One advantage of this invention is clean up efficiency. That is, the fluid is cleaned up (i.e. dissipated upon conclusion of fracturing) at a rate that is 40–75% better than comparable fluids without the buffer (at the same guar level).

Any suitable crosslinking metal ion, metal containing species, or mixture of such ions and species may be employed in this invention. The term "metal crosslinked" is understood to include crosslinking attributable to certain metal containing species, such as borate ion. The crosslinking ions or species may be provided by dissolving into the solution compounds containing the appropriate metals, or by other means. Metal ions or metal containing species including those of boron, zirconium, and titanium are particularly good in many applications. These species may be supplied from many different compounds, including but not limited to those set forth below:

| | |
|---|---|
| probertite | $NaCaB_5O_9 \cdot 5H_2O$ |
| ulexite | $BaCaB_5O_9 \cdot 8H_2O$ |
| nobleite | $CaB_6O_{10} \cdot 4H_2O$ |
| gowerite | $CaB_6O_{10} \cdot 5H_2O$ |
| frolovite | $Ca_2B_4O_8 \cdot 7H_2O$ |
| colemanite | $Ca_2B_6O_{11} \cdot 5H_2O$ |
| meyerhofferite | $Ca_2B_6O_{11} \cdot 7H_2O$ |
| inyoite | $CaB_6O_{11} \cdot 13H_2O$ |
| priceite | $Ca_4B_{10}O_{19} \cdot 7H_2O$ |
| tertschite | $Ca_4B_{10}O_{19} \cdot 20H_2O$ |
| ginorite | $Ca_2B_{14}O_{23} \cdot 8H_2O$ |
| pinnoite | $MgB_2O_4 \cdot 3H_2O$ |
| paternoite | $MgB_8O_{13} \cdot 4H_2O$ |
| kurnakovite | $Mg_2B_6O_{11} \cdot 15H_2O$ |
| inderite | $MgB_6O_{11} \cdot 15H_2O$ |
| preobrazhenskite | $Mg_3B_{10}O_{18} \cdot 4\frac{1}{2}H_2O$ |
| hydroboracite | $CaMgB_6O_{11} \cdot 6H_2O$ |
| inderborite | $CaMgB_6O_{11} \cdot 11H_2O$ |
| kaliborite | $KMg_2B_{11}O_{19} \cdot 9H_2O$ |
| veatchite | $SrB_6O_{10} \cdot 2H_2O$ |

Preferred species of metal ions include boric acid, sodium borates, boric oxide, zirconium oxide, and titanium oxide. Sodium tetraborate is a preferred species of boron for certain applications.

Encapsulated compounds, such as encapsulated metal ion species, also may be used. In one embodiment, the encapsulated metal ion species may be encapsulated borate. Encapsulated borate may be prepared by providing a hydrocarbon-based enclosure member which envelopes the breaker. Encapsulation of compounds may be accomplished by known methods of encapsulation. U.S. Pat. No. 4,919, 209 describes the encapsulation process as applied to breakers, for example.

The concentration of added crosslinking metal releasing agent is dependent upon factors such as the temperature and the amount of thickening agent employed, and normally will range from about 5 ppm to about 100 ppm, preferably from about 10 ppm to about 70 ppm. It is an important advantage of the invention that higher levels of the crosslinking metal ion or metal containing species may be employed, thereby insuring improved crosslinking. While crosslinking may be virtually immediate, a slight delay thereof, up to twenty seconds or so, may actually be preferred in the field since it allows mixing and pumping of the precursor solution through surface equipment. In this way, formation of the composition is feasible "on the fly".

Any buffering agent or combination of such that will provide or maintain the solution at the necessary pH required may be employed. Thus, the combination of a weak acid and its salts may be employed, so long as the pH of the solution is maintained in the range mentioned. For example, the corresponding acid and ammonium and alkali metal phosphates, carbonates, bicarbonates, sesquicarbonates, acetates, or mixtures thereof may be used. Ammonium, potassium, and sodium carbonates, bicarbonates, sesquicarbonates and hydrogen phosphates are preferred as buffer salt components. Soluble borates are preferred for the low temperature applications (boric acid, sodium borate, boric oxide, sodium tetraborate etc.). While these can be used to some extent, most of the borate must be in the form of a slowly soluble salt for this application.

For pH values toward the upper end of the range specified, combinations of alkali metal hydroxide and appropriate weak acid salt may be employed. For example, a buffer comprising a base such as NaOH or KOH and a weak acid salt such as $Na_2H_2PO_4$ may be used. Proportioning of the buffer components of the combinations to achieve the desired pH is well within the ambit of those skilled in the art.

As will be appreciated by those skilled in the art, other additives commonly employed in fracturing solutions, such as breakers, clays, additives etc., must be selected so that they do not significantly reduce the pH of the solution. As indicated, the pH required in the various embodiments of the invention ranges from about 9 to 11, preferably from about 9.5 to about 10. The amount of buffer required is an effective amount, i.e., an amount sufficient to maintain the desired pH, given the additives and other components of the fluid. Preferably, this amount will not exceed 50 pounds per 1000 gallons of fluid, most preferably, not more than about 20 pounds per 1000 gallons of fluid. A stabilizer selected from the group consisting of polyhydric alcohols, glycerin, saccharides, and hydroxyalkyl amine may be used.

To illustrate the invention more fully, the following procedures were performed.

Reduced Polymer Loaded of Fracturing Fluids at Temperatures Below 175° F.

Base fluids comprising fifteen pounds and twenty pounds of guar respectively per 1000 gallons of fresh water, optionally containing KCl or similar salt, were prepared, and the guar in each was allowed to hydrate. The fluids also contained minor amounts of normal, non-active (from the standpoint of crosslinking activity) fracturing fluid additives such as a surfactant, a biocide, and a defoamer. These fluids were used in the tests reported hereinafter. Sodium sesquicarbonate and sodium carbonate were added as a buffering agent to each base fluid in the amount of 12 pounds and 5 pounds, respectively, per 1000 gallons. Finally, boric acid, as a 3.5 percent by weight solution in water, based on the weight of the water and acid, was mixed with each of the base fluids containing the buffer to give a concentration of 1.5–2.2 pounds of boric acid per 1000 gallons (see FIG. 1). Borate crosslinking of the guar was effected within 5 to 20 seconds.

To demonstrate the suitability of the fluids for fracturing, viscosity tests were performed. The conditions of and results of the tests are given in the tables below. Table I reports results with the 15 pound solution, while Table II reports results with the 20 pound solution. In both tables, viscosity results are rounded to the nearest $5^{th}$ unit.

TABLE I

VISCOSITY RESULTS OF 15 POUND SOLUTION

| Temperature | Viscosity, Initial | 100 sec$^{-1}$ (cp) Final (3 hours) |
|---|---|---|
| 1) 100° F. | 135 | 120 |
| 2) 125° F. | 140 | 110 |
| 3) 150° F. | 140 | 105 |

TABLE II

VISCOSITY RESULTS OF 20 POUND SOLUTION

| Temperature | Viscosity, Initial | 100 sec$^{-1}$ (cp) Final (3 hours) |
|---|---|---|
| 1) 100° F. | 350 | 275 |
| 2) 125° F. | 370 | 255 |
| 3) 150° F. | 290 | 250 |
| 4) 175° F. | 285 | 180 |

Upon completion of fracturing, removal and associated breakdown of the fluid in the fracture is important. Compositions termed "breakers" (e.g., typically ammonium persulfate or peroxide) are used to assist in the breakdown. The retained conductivity of the formation after such withdrawal and/or breakdown is an important measure of fracturing fluid efficiency.

Accordingly, standardized retained conductivity tests were run on two fluids according to the invention, utilizing a combination breaker system, the fluids containing 15 pounds (fluid A) and 20 pounds (fluid B)("A" and "B" designators are set forth in the Table below) per 1000 gallons, respectively, of hydrated borate crosslinked galactomannan gum thickener. Each fluid was buffered with 12 pounds of sodium sesquicarbonate and 5 pounds of sodium carbonate. Proppant type was 20/40 Badger sand at a concentration of 2 lb./ft$^2$. A two percent by weight KCl solution was used as a base line solution. Results are shown in Table III below.

TABLE III

RETAINED CONDUCTIVITY RESULTS FOR 15 AND 20 POUND FRACTURING FLUIDS

| | T ° F. | Breaker (lb./ 1000 gals) | Closure Press. (psi) | Final Polymer Conc (lb./ 1000 gal) | Conductivity (Darcy) | Percent Retained Conductivity |
|---|---|---|---|---|---|---|
| 2% KCl | 125 | 0 | 2000 | * | 216 | * |
| A | 125 | 2.5 Tot | 2000 | 159 | 130 | 60 |
| B | 125 | 3.0 Tot | 2000 | 188 | 106 | 49 |

Static fluid coefficients for fluids according to the invention were determined utilizing standard fluid loss coefficient procedures. Results are shown in Table IV.

TABLE IV

STATIC FLUID COEFFICIENTS FOR TEMPERATURES UP TO 175° F.

| Fluid (lb./1000 gal) | Temp. (F.) | Perme-ability (md) | Cw (ft/min$^{1/2}$) | Spurt (gal/100 ft$^2$) |
|---|---|---|---|---|
| 15 | 100 | 0.76 | 0.0017 | 1.82 |
| 15 | 125 | 0.77 | 0.0018 | 0.15 |
| 15 | 150 | 0.73 | 0.0023 | 5.17 |
| 20 | 100 | 0.77 | 0.0014 | 0.0 |
| 20 | 125 | 0.80 | 0.0016 | 0.0 |
| 20 | 150 | 0.71 | 0.0013 | 0.0 |
| 20 | 175 | 0.80 | 0.0032 | 0.0 |

These results demonstrate the suitability of the low polymer concentration borate crosslinked guar solution, buffered according to the invention, for use as a fracturing fluid.

In the manner described above, a fracturing fluid was prepared containing, per 1000 gallons, 10 pounds of guar, 1.5 pounds of boric acid, and 5 pounds each of sodium bicarbonate and sodium carbonate. Viscosity of solution at 90° F. was greater than 100 cp. at 100 sec$^{-1}$ shear. This further experiment demonstrates the ability of the borate-buffer combination to crosslink very reduced concentrations of galactomannan gum.

Fracturing Fluids Are Effective at Elevated Temperature With Soluble or Encapsulated Borate Sources Rheological application of the fluids disclosed herein are quite useful at elevated well temperatures, that is, at temperatures above 175° F. Slowly dissolving borate sources, such as $Na_2B_4O_7$, allow the use of higher borate concentrations without overcrosslinking at the surface in a short period of time. It has been observed that conventional soluble borates, if used at elevated temperatures, require higher concentrations of borate to crosslink the polymer. However, higher concentrations of borate may result in undesirable overcrosslinking of borate with polymer rapidly upon mixing, an undesirable result. Therefore, such slowly soluble borate sources are particularly advantageous at temperatures in excess of 175° F. because they avoid the problem of overcrosslinking upon mixing.

Figure 1:
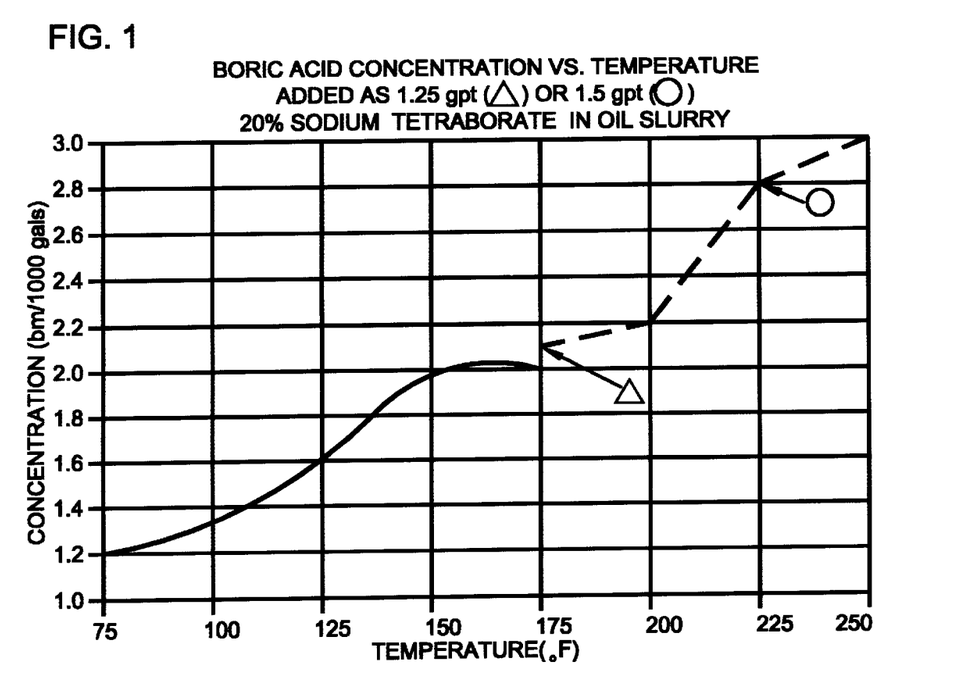
FIG. 1 shows the concentration of boron source needed to produce a rheologically functional fluid at various temperatures.

FIG. 1 shows the amount of boric acid and equivalent borate source needed to produce a rheologically functional fluid up to 250° F. using the 12 lb sodium sesquicarbonate and 5 lb sodium carbonate/1000 gal. buffer. FIG. 1 plots boric acid or 20% sodium tetraborate in oil slurry equivalent concentration versus temperature, and it shows the data for elevated temperatures as seen in Table 1 and 2 on the right portion of the graph. It can be seen that higher concentrations of borate ion are available at elevated temperatures using the compositions of this invention.

Figure 2:
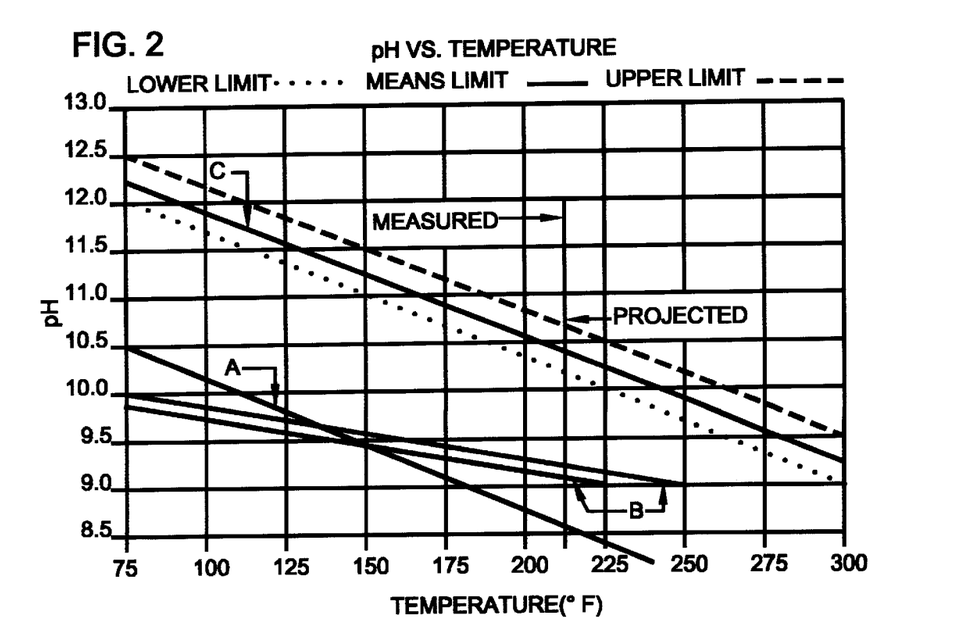
FIGS. 2 shows the effect of increasing temperature on pH of various fluids.
Figure 3:
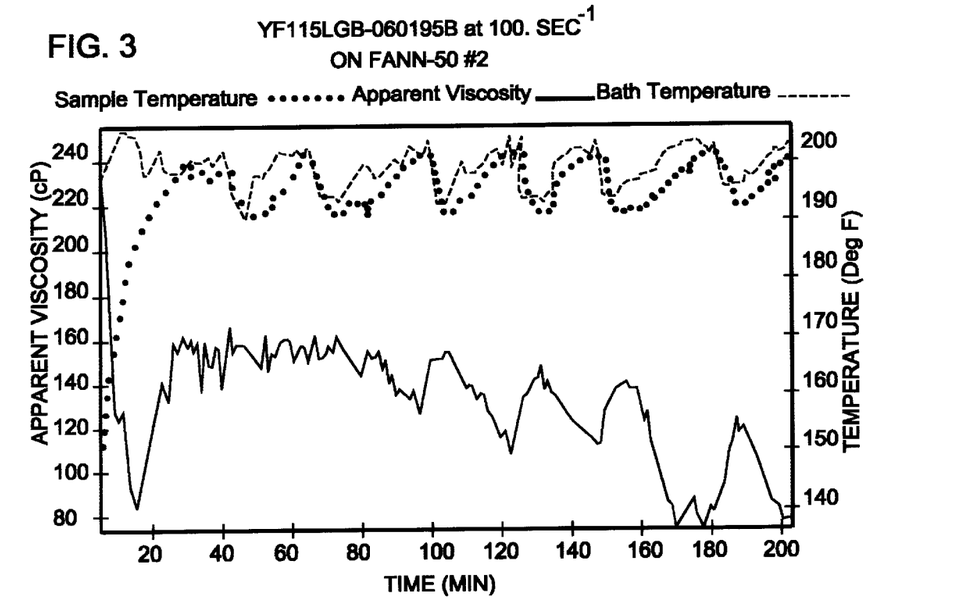
FIGS. 3–8 show real time viscosity for various fluids disclosed herein.
Figure 4:
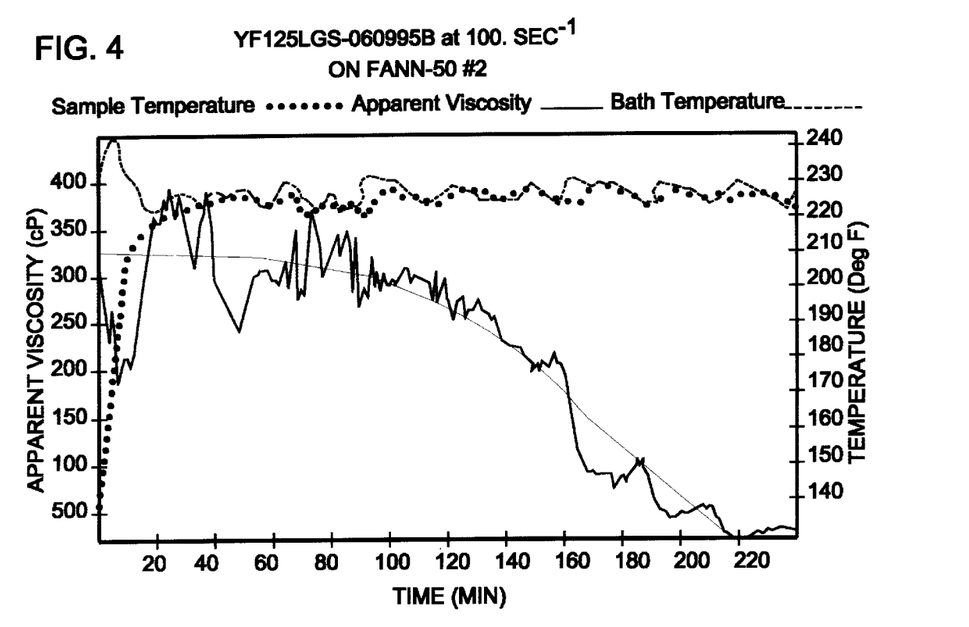
Figure 5:
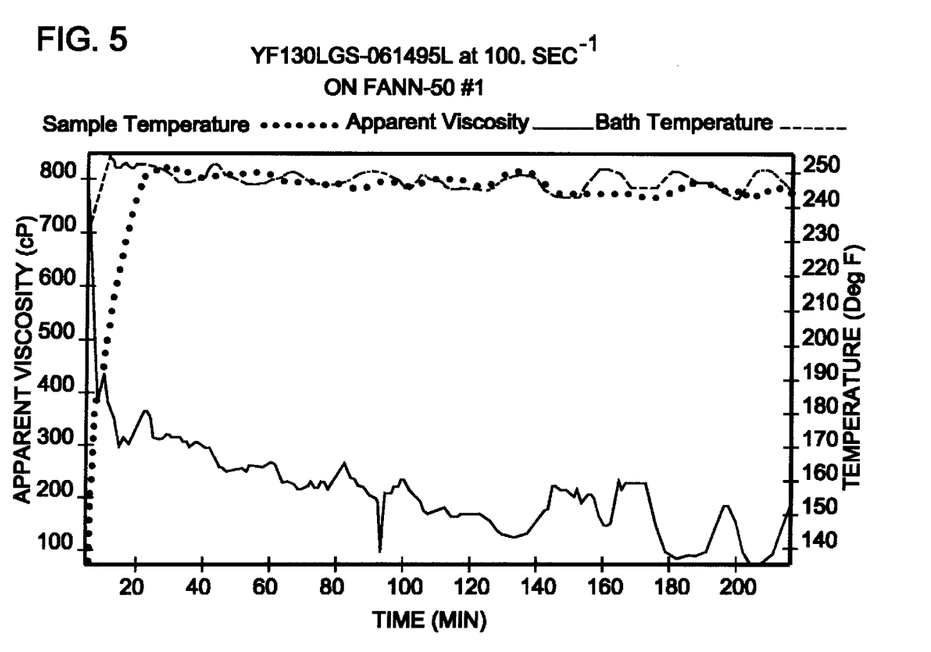
Figure 6:
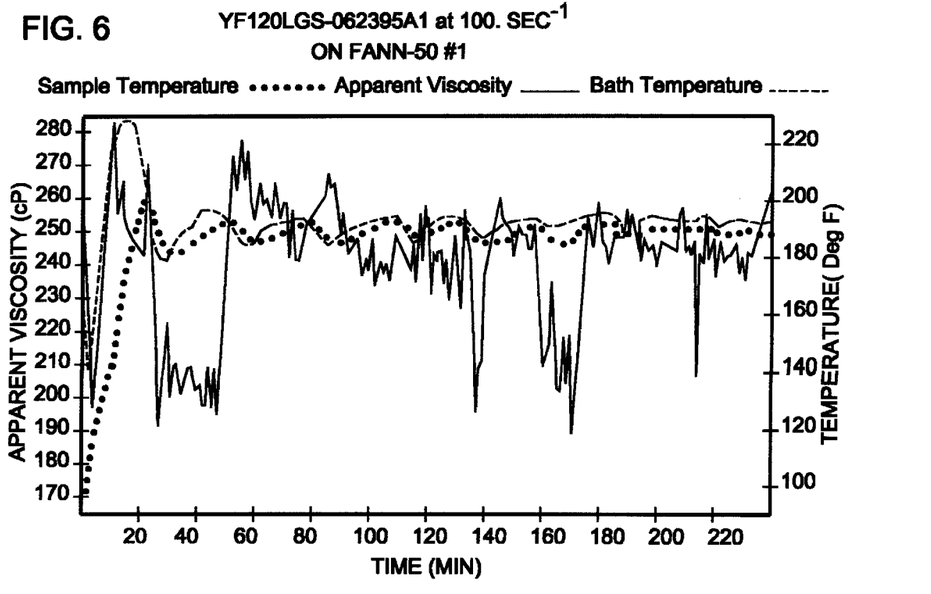

FIG. 2 shows the effects of increasing temperature on pH for four different fluids. It shows three different relationships, labeled on the graph as A, B, and C. Line A represents the pH profile versus temperature of a 30 lb guar fluid crosslinked by 1.2 lb boric acid and about 1.8 lb caustic/1000 gallon. Line B shows the pH profile versus temperature of a 15 to 30 lb guar fluid using boric acid or sodium tetraborate for crosslinking and 12 lbs sodium sesquicarbonate and 5 lbs sodium carbonate as the alkaline/buffer activator. In line C, the pH profile versus temperature of 30 to 40 guar fluid crosslinked using an organically chelated borate and activated with caustic to a pH of about 12.

The Tables V, VI, VII, and VIII below show that the low guar fluids utilizing a slowly soluble borate source show effective viscosities at elevated temperatures. The fluid used to obtain the results shown in Table V through Table XI is commercially known and used as Dowell YF115LGS™.

Table V contains 15 lbs of guar/1000 gal water and shows crosslinked results with 1.5 gallons of a 20% sodium tetraborate in oil slurry. The crosslink is activated/buffered with sodium sesquicarbonate and sodium carbonate at a pH of about 10.

Table VI (data for YF125LGS™) contains 25 lbs guar/1000 gall water and is crosslinked with 1.5 gallons/1000 gal of a 20% sodium tetraborate in oil slurry. The crosslink is activated/buffered with sodium sesquicarbonate and sodium carbonate at a pH of about 10. Table VII (data for YF130LGS™) contains 30 lbs guar/1000 gal water. Sodium thoisulfate, an oxygen scavenger, is added at 10 lbs/1000 gal of gel before crosslinking. The gel is crosslinked with 1.6 gallons/1000 gal of a 20% sodium tetraborate in oil slurry. The crosslink is activated/buffered with sodium sesquicarbonate and sodium carbonate at a pH of about 10.

The data of Table V and VIII was collected at a test temperature of 200° F., while the data of Tables VI, X and XI were collected at 225° F. The data for Table VII was collected at 250° F. Each was at a fluid pH of about 10, using deionized water containing 2% Kcl. The viscosity measurements were made using a Fann 50 Viscometer following API 193F3 procedure.

TABLE V

VISCOSITY DATA FOR YF115LGS FLUID

| Run | Time min | Temp ° F. | N-Prime | $K_v$ | Corr | Kp-prime | Viscosities (CPS) 40 | 170 | 511 |
|---|---|---|---|---|---|---|---|---|---|
| 1 | 16 | 191 | 0.82772 | 0.0065 | 0.9918 | 0.0067 | 169 | 131 | 109 |
| 2 | 46 | 193 | 0.81164 | 0.0082 | 0.9330 | 0.0084 | 201 | 153 | 124 |
| 3 | 74 | 194 | 0.78177 | 0.0095 | 0.9480 | 0.0098 | 209 | 152 | 120 |
| 4 | 104 | 194 | 0.95776 | 0.0040 | 0.9818 | 0.0040 | 165 | 156 | 148 |
| 5 | 134 | 195 | 0.88363 | 0.0047 | 0.9747 | 0.0047 | 147 | 124 | 109 |
| 6 | 139 | 198 | 0.94864 | 0.0032 | 0.9725 | 0.0032 | 128 | 119 | 112 |
| 7 | 168 | 203 | 1.76051 | 0.0001 | 0.9456 | 0.0001 | 43 | 130 | 300 |
| 8 | 198 | 201 | 1.56542 | 0.0002 | 0.9429 | 0.0001 | 54 | 123 | 229 |

TABLE VI

VISCOSITY DATA FOR YF125LGS FLUID

| Run | Time min | Temp ° F. | N-prime | Kv | Corr | Kp-prime | Viscosities (CPS) 40 | 170 | 511 |
|---|---|---|---|---|---|---|---|---|---|
| 1 | 19 | 215 | 0.57143 | 0.0532 | 0.9782 | 0.0554 | 546 | 294 | 183 |
| 2 | 49 | 226 | 0.43337 | 0.0863 | 0.9608 | 0.0906 | 537 | 236 | 127 |
| 3 | 79 | 224 | 0.46196 | 0.0824 | 0.9657 | 0.0864 | 569 | 261 | 144 |
| 4 | 109 | 226 | 0.68555 | 0.0282 | 0.9237 | 0.0291 | 437 | 277 | 196 |
| 5 | 139 | 226 | 1.91220 | 0.0001 | 0.9994 | 0.0001 | 91 | 341 | 930 |
| 6 | 169 | 230 | 2.48925 | 0.0000 | 0.9907 | 0.0000 | 23 | 197 | 1014 |
| 7 | 199 | 228 | 3.08905 | 0.0000 | 0.9863 | 0.0000 | 8 | 174 | 1737 |
| 8 | 229 | 225 | 2.80456 | 0.0000 | 0.9956 | 0.0000 | 6 | 84 | 612 |

TABLE VII

VISCOSITY DATA FOR YF130LGS FLUID

| Time min | Temp °F. | N-prime | Kv | Corr | Kp-prime | Viscosities (CPS) 40 | 170 | 511 |
|---|---|---|---|---|---|---|---|---|
| 1 | 18 | 241 | 0.53085 | 0.0751 | 0.9932 | 0.0785 | 666 | 338 | 201 |
| 2 | 48 | 252 | 1.06707 | 0.0045 | 0.9974 | 0.0045 | 274 | 302 | 325 |
| 3 | 78 | 248 | 1.65691 | 0.0003 | 0.9955 | 0.0003 | 152 | 394 | 811 |
| 4 | 108 | 250 | 2.40521 | 0.0000 | 0.9924 | 0.0000 | 49 | 377 | 1772 |
| 5 | 138 | 252 | 2.47856 | 0.0000 | 0.9888 | 0.0000 | 42 | 353 | 1798 |
| 6 | 168 | 246 | 3.10817 | 0.0000 | 0.9968 | 0.0000 | 30 | 642 | 6535 |
| 7 | 192 | 250 | 3.18325 | 0.0000 | 0.9869 | 0.0000 | 19 | 441 | 4879 |
| 8 | 211 | 247 | 3.68526 | 0.0000 | 0.9941 | 0.0000 | 11 | 548 | 10533 |

*(Note: first column is row index; headers shifted — row 1 header values include row number.)*

In Table VIII below, the YF120LGS™ fluid was used providing 20 lbs of guar/1000 gal water. Sodium gluconate, a stabilizer, was added at 5 lbs/1000 gallons of gel. The gel was crosslinked using 1.4 gallons/1000 gal of a 20% sodium tetraborate in oil slurry. The crosslink is activated/buffered with sodium sesquicarbonate and sodium carbonate at a pH of about 10.

Table IX shows retained conductivity data for YF100LGS™.

Table X shows results for YF125LGS™ containing 25 lbs guar/1000 gal water. Triethanolamine, a stabilizer, was used at 0.5gallons/1000 gallons of gel. The gel is crosslinked using 1.5 gallons/1000 gal of a 20% sodium tetraborate in oil slurry. The gel is crosslinked using 1.5 gal/1000 gal gel of a 20% sodium tetraborate in oil slurry. The crosslinked is activated/buffered with sodium sesquicarbonate and sodium carbonate at a pH of about 10. There is an improvement in fluid stability over that shown in Table VI.

Figure 7:
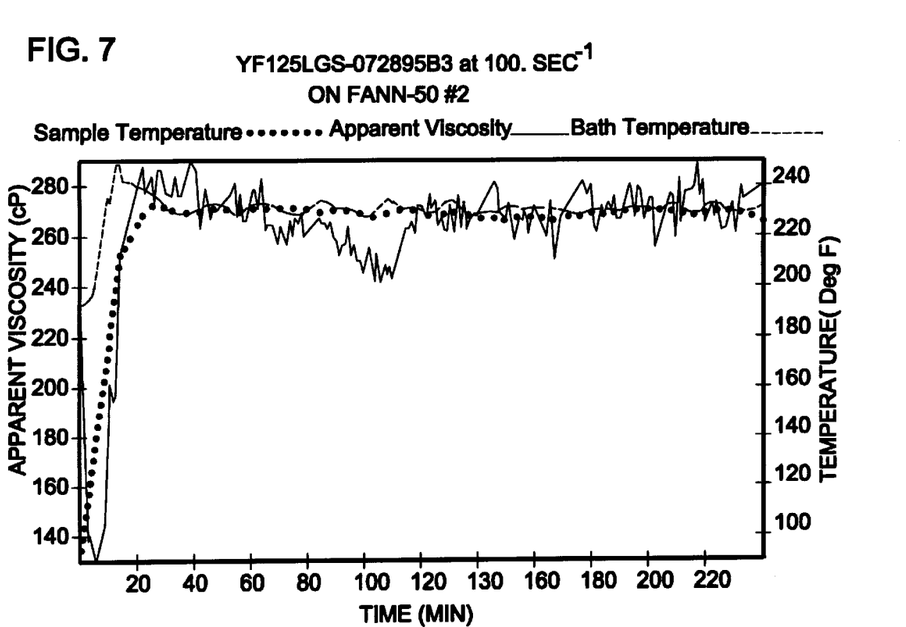
Figure 8:
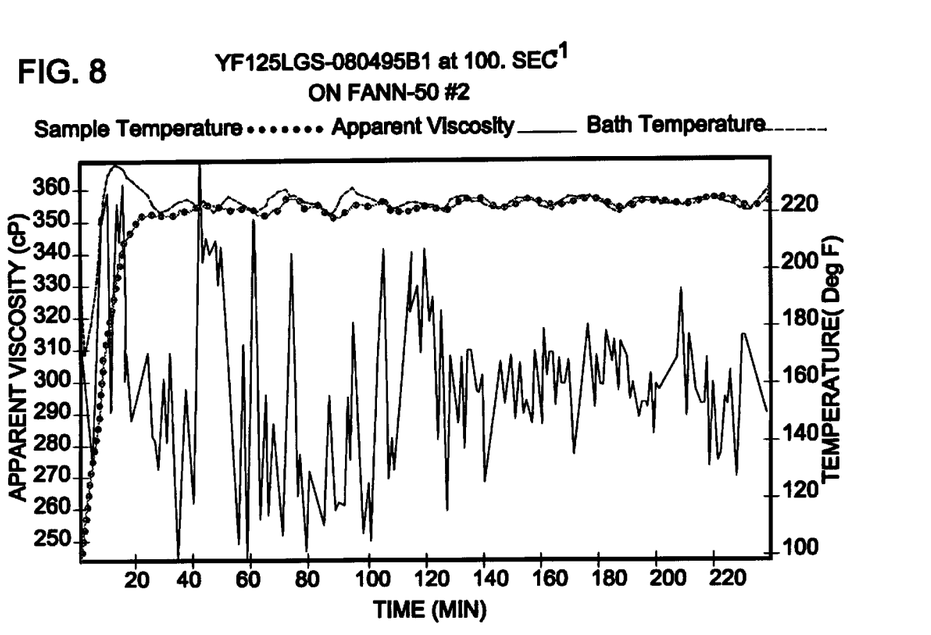

In Table XI, YF125LGS™ contained 25 lbs guar/1000 gallons of water. Sorbitol at 1 lb and triethanol amine @ 1 gal/1000 gal (both stabilizer) are added to the gel and crosslinked using 1.5 gal/1000 gal of a 20% sodium tetraborate in oil slurry. The crosslink is activated/buffered with sodium sesquicarbonate and sodium carbonate at a pH of about 10. One can note the improvement in early fluid stability as seen in FIG. 7 versus FIG. 8 of the real time viscosity plots.

TABLE VIII

VISCOSITY DATA FOR YF120LG FLUID

| Time min | Temp | N-prime | Kv | Corr | Kp-prime | Viscosities (CPS) 40 | 170 | 511 |
|---|---|---|---|---|---|---|---|---|
| 17 | 192 | 0.63002 | 0.0327 | 0.9463 | 0.0339 | 415 | 243 | 162 |
| 47 | 199 | 0.52042 | 0.0525 | 0.9927 | 0.0549 | 448 | 224 | 132 |
| 77 | 200 | 0.44281 | 0.0731 | 0.9654 | 0.0768 | 471 | 210 | 114 |
| 107 | 201 | 0.47090 | 0.0631 | 0.9957 | 0.0662 | 450 | 209 | 117 |
| 137 | 194 | 0.52366 | 0.0502 | 0.9868 | 0.0525 | 434 | 218 | 129 |
| 167 | 194 | 0.51761 | 0.0508 | 0.9896 | 0.0531 | 429 | 213 | 126 |
| 197 | 199 | 0.54566 | 0.0422 | 0.8935 | 0.0440 | 395 | 204 | 124 |
| 227 | 197 | 0.55754 | 0.0400 | 0.8860 | 0.0418 | 391 | 206 | 127 |

The data of Table V and VIII was collected at a test temperature of 200° F., while the data of Tables VI, X and XI were collected at 225° F. The data for Table VII was collected at 250° F. Each was at a fluid pH of about 10, using deionized water containing 2% Kcl. The viscosity measurements were made using a Fann 50 Viscometer following API 193F3 procedure.

FIGS. 3, 4, 5, 6, 7 and 8 show real-time viscosity at 100 sec$^{-1}$ versus time graphs of the data collected and shown in tables V, VI, VII, VIII, X and XI for the various fracturing fluids. It is generally accepted in the industry that proppant can be effectively transported by fluid having a viscosity of at least 100 cps @ 100 sec$^{-1}$ shear. It can be seen that even at elevated temperatures, the viscosity of fracturing fluids of this invention provide acceptable levels for fracturing. Conductivity testing also reveals the successful results of this invention. Conductivity testing of retained conductivity of YF100LGS™ taken at temperatures of 200–250° F. show that the fluids prepared and buffered with the sodium sesquicarbonate/sodium carbonate produce retained conductivities of 7 to 20% (absolute) higher than traditional borate crosslinked fluids using NaOH for the alkaline component.

TABLE IX

RETAINED CONDUCTIVITY DATA YF100LGS

| Fluid Type | Temp (° F.) | J218/J275 Conc. (lb/1000 gal) | Closure Pressure (psi) | Final Polymer Conc. | Conductivity (Darcy) | Percent Retained Conductivity |
|---|---|---|---|---|---|---|
| 2% KCl | 200 | * | 4500 | * | 400 | * |
| YF120LGS | 200 | 0.15/2.0 | 4500 | 190 | 248 | 62 |

TABLE IX-continued

RETAINED CONDUCTIVITY DATA YF100LGS

| Fluid Type | Temp (° F.) | J218/J275 Conc. (lb/1000 gal) | Closure Pressure (psi) | Final Polymer Conc. | Conductivity (Darcy) | Percent Retained Conductivity |
|---|---|---|---|---|---|---|
| YF125.1HTD | 200 | 0/3.0 | 4500 | 265 | 168 | 42 |
| 2% KCl | 225 | * | 5000 | * | 370 | * |
| YF130LGS | 225 | 0/3 | 5000 | 282 | 126 | 34 |
| YF130.1HTD | 225 | 0/1 | 5000 | 299 | 83 | 22 |
| YF130.1HTD | 225 | 10$^{(1)}$ | 5000 | 312 | 100 | 27 |
| 2% KCl | 250 | * | 6000 | * | 296 | * |
| YF130LGS | 250 | 0.5$^{(1)}$ | 6000 | 312 | 70 | 24 |
| YF130.1HTD | 250 | 0.5$^{(1)}$ | 6000 | 317 | 40 | 14 |

*denotes baseline test data.

The invention has been described in the more limited aspects of preferred embodiments hereof, including numerous examples. Other embodiments have been suggested and still others may occur to those skilled in the art upon a reading and understanding of the specification. It is intended that all such embodiments be included within the scope of this invention.

TABLE X

Rheology Values (Calculated) For YF125LGS Fluid

|  |  |  |  |
|---|---|---|---|
| | Test Temperature: | 225 | |
| | Fluid pH: | 9.0 | |
| | Instr Method: | FRAC1 | |
| | S Hist Method: | LT | |
| Additives | Name | Concentration | Units |
| | J877 | 25.0000 | gal/1000 g |
| | M117 | 166.0000 | lb/1000 ga |
| | J353 | 0.0000 | lb/1000 ga |
| | F075N | 1.0000 | gal/1000 g |
| | M076 | 0.5000 | gal/1000 g |
| | D047 | 0.2500 | gal/1000 g |
| | L055 | 0.0000 | gal/1000 g |
| Comments | DI WATER 2% KCL | | |
| | BASELINE | | |
| | 1.50 LBS. B59 | | |
| | 11.30 GPT. J494 | 5 LBS. M3 (16% SOL.) | |
| | 0.5 GAL. J450 | | |
| | SHEARED AT 300 SEC −1 FOR 1 MIN | | |
| | 170 SEC −1 = 27.75 | | |
| | 511 SEC −1 = 17.25 @ 78 F. | | |

Results

| | Time (min) | Temp | N-Prime | Kv | Corr | Kp-prime | 40. | 170. | 511. |
|---|---|---|---|---|---|---|---|---|---|
| 1 | 17. | 216. | 0.40622 | 0.0895 | 0.9245 | 0.0941 | 504. | 213. | 111. |
| 2 | 47. | 225. | 0.53406 | 0.0502 | 0.9984 | 0.0525 | 450. | 230. | 137. |
| 3 | 77. | 224. | 0.60160 | 0.0360 | 0.9882 | 0.0375 | 412. | 232. | 149. |
| 4 | 107. | 226. | 0.58895 | 0.0371 | 0.9695 | 0.0386 | 406. | 224. | 142. |
| 5 | 137. | 223. | 0.51097 | 0.0569 | 0.9814 | 0.0595 | 469. | 231. | 135. |
| 6 | 167. | 225. | 0.57727 | 0.0416 | 0.9942 | 0.0434 | 437. | 237. | 149. |
| 7 | 197. | 225. | 0.64796 | 0.0298 | 0.9813 | 0.0309 | 403. | 242. | 165. |
| 8 | 227. | 224. | 0.53023 | 0.0519 | 0.9818 | 0.0542 | 459. | 232. | 139. |

TABLE XI

Rheology Values (Calculated)
For YF125LGS Fluid

| | Test Temperature: | 225 | |
|---|---|---|---|
| | Fluid pH: | 9.0 | |
| | Instr Method: | FRAC1 | |
| | S Hist Method: | LT | |
| Additives | Name | Concentration | Units |
| | J877 | 25.0000 | gal/1000 g |
| | M117 | 166.0000 | lb/1000 ga |
| | J353 | 0.0000 | lb/1000 ga |
| | F075N | 1.0000 | gal/1000 g |
| | M076 | 0.5000 | gal/1000 g |
| | D047 | 0.2500 | gal/1000 g |
| | L055 | 0.0000 | gal/1000 g |
| Comments | DI WATER 2% KCL | | |
| | BASELINE | | |
| | 1.50 LBS. B59 | | |
| | 11.30 GPT. J494 | 5 LBS. M3 (16% SOL.) | |
| | 1 LBS. SORBITOL | | |
| | 1 GPT. J450 | | |
| | SHEARED AT 300 SEC −1 FOR 1 MIN | | |
| | 170 SEC −1 = 28.50 | | |
| | 511 SEC −1 = 17.50 @ 77 F. | | |

Results

| | Time (min) | Temp | N-Prime | Kv | Corr | Kp-prime | viscosities (CPS) 40. | 170. | 511. |
|---|---|---|---|---|---|---|---|---|---|
| 1 | 16. | 216. | 0.43415 | 0.0978 | 0.6376 | 0.1027 | 610. | 269. | 144. |
| 2 | 46. | 225. | 0.65774 | 0.0330 | 0.9041 | 0.0342 | 463. | 282. | 193. |
| 3 | 76. | 224. | 0.46717 | 0.0797 | 0.9479 | 0.0836 | 561. | 259. | 144. |
| 4 | 106. | 224. | 0.57127 | 0.0514 | 0.9781 | 0.0535 | 527. | 284. | 177. |
| 5 | 136. | 227. | 0.51657 | 0.0627 | 0.9579 | 0.0656 | 528. | 262. | 154. |
| 6 | 166. | 227. | 0.63347 | 0.0351 | 0.9825 | 0.0364 | 451. | 265. | 177. |
| 7 | 196. | 227. | 0.67477 | 0.0299 | 0.9903 | 0.0309 | 446. | 279. | 195. |
| 8 | 226. | 224. | 0.79865 | 0.0169 | 0.9871 | 0.0173 | 395. | 295. | 236. |

What is claimed is:

1. A well treating fluid comprising:
   (a) an aqueous hydrated galactomannan gum;
   (b) a buffering agent effective to provide alkaline buffering at the effective crosslinking pH comprising a weak acid and a salt of said weak acid, in an amount sufficient to provide a controlled alkaline pH of from about 9 to about 11 in the fluid;
   (c) a crosslinking boron releasing agent capable of furnishing boron ions, borate ions, or mixtures thereof, in solution for crosslinking said galactomannan gum;
   (d) the well treating fluid being effective at reduced concentration levels of galactomannan gum comprising from about 10 to about 30 pounds of aqueous hydrated galactomannan gum per 1000 gallons of fluid;
   (e) further wherein the fluid is effective to delay release of boron ions, borate ions, or mixtures thereof while facilitating a sufficiently elevated concentration level of boron ions, borate ions, or mixtures thereof to allow the effective use of the fluid at temperatures in excess of 175° F.

2. The fluid of claim 1 wherein the crosslinking boron releasing agent comprises a boron ion slurry.

3. The fluid of claim 1 wherein the buffering agent comprises at least one member selected from the group consisting of ammonium, potassium, and sodium carbonates, bicarbonates, sesquicarbonates and hydrogen phosphates.

4. A well treating fluid comprising:
   (a) an aqueous hydrated galactomannan gum;
   (b) a buffering agent effective to provide alkaline buffering at the effective crosslinking pH comprising a weak acid and a salt of said weak acid, in an amount sufficient to provide a controlled alkaline pH of from about 9 to about 11 in the fluid, one component of the buffering agent comprising at least one member selected from the group consisting of ammonium, potassium, and sodium carbonates, bicarbonates, sesquicarbonates and hydrogen phosphates;
   (c) a metal ion source capable of furnishing metal ions in solution for crosslinking said galactomannan gum wherein the metal ion source comprises a boron containing compound,
   (d) the well treating fluid being effective at reduced concentration levels of galactomannan gum comprising from about 10 to about 30 pounds of aqueous hydrated galactomannan gum per 1000 gallons of fluid;
   (e) further wherein the fluid is effective to delay release of metal ions while facilitating a sufficiently elevated concentration level of metal ions to allow the effective use of the fluid at temperatures in excess of 175° F.

5. The composition of claim 4 wherein the boron containing compound is a slowly soluble borate salt.

6. The composition of claim 4 wherein the boron is encapsulated.

7. The composition of claim 4 wherein the boron-containing-compound comprises sodium tetraborate.

8. The composition of claim 4 further comprising a stabilizer.

9. The composition of claim 8 wherein the stabilizer is selected from the group consisting of polyhydric alcohols, glycerin, saccharides and hydroxyalkyl amine.

10. The composition of claim 9 wherein the stabilizer is sodium gluconate.

11. The composition of claim 9 wherein the stabilizer is triethanol amine.

12. A method of fracturing a subterranean formation penetrated by a borehole, comprising injecting into the borehole and into contact with the formation, at a rate and pressure sufficient to fracture the formation, and at elevated temperatures, an alkaline fracturing fluid composition comprising:

(a) an aqueous hydrated galactomannan gum;

(b) a buffering agent effective to provide alkaline buffering at the effective crosslinking pH comprising a weak acid and a salt of said weak acid, in an amount sufficient to provide a pH of from about 9 to about 11 in the fluid;

(c) a slurry capable of furnishing boron ions, borate ions, or mixtures thereof, in solution for crosslinking said galactomannan gum; and (d) the well treating fluid being effective at reduced concentration levels of galactomannan gum comprising from about 10 to about 30 pounds of aqueous hydrated galactomannan gum per 1000 gallons of fluid;

(e) the fluid being effective to delay release of boron ions, borate ions, or mixtures thereof while facilitating a sufficiently elevated concentration level of boron ions, borate ions, or mixtures thereof to allow the effective use of the fluid at temperatures in excess of 175° F.

13. A well treating fluid, comprising:

(a) an aqueous hydrated galactomannan gum;

(b) a buffering agent effective to provide alkaline buffering at the effective crosslinking pH of the fluid, the buffering agent comprising a weak acid and a salt of said weak acid, in an amount sufficient to provide a controlled alkaline pH of from about 9 to about 11 in the fluid, the buffering agent effectively resisting pH changes as a function of temperature;

(c) a crosslinking boron releasing agent capable of furnishing boron ions, borate ions, or mixtures thereof, in solution for crosslinking said galactomannan gum;

(d) the well treating fluid being effective to crosslink and maintain fluid viscosity at reduced concentration levels of galactomannan gum comprising from about 10 to about 30 pounds of aqueous hydrated galactomannan gum per 1000 gallons of fluid;

(e) further wherein the fluid is effective to delay release of boron ions, borate ions, or mixtures thereof while facilitating a sufficiently elevated concentrated level of boron ions, borate ions, or mixtures thereof to allow the effective use of the fluid.

14. The fluid of claim 13 wherein the crosslinking boron releasing agent comprises a boron ion slurry.

15. The fluid of claim 13 wherein the buffering agent comprises a weak acid and a salt of the weak acid, wherein the salt of the weak acid is selected from the group consisting of ammonium carbonates, potassium carbonates, sodium carbonates, bicarbonates, sesquicarbonates and hydrogen phosphates.

16. The composition of claim 13 wherein the crosslinking boron releasing agent comprises a boron-containing compound.

17. The composition of claim 16 wherein the crosslinking boron releasing agent is a slowly soluble borate salt.

18. The composition of claim 16 wherein the boron containing compound is encapsulated.

19. The composition of claim 16 wherein the boron-containing compound comprises sodium tetraborate.

20. The composition of claim 16 further comprising a stabilizer.

21. The composition of claim 20 wherein the stabilizer is selected from the group of polyhydric alcohols, glycerin, saccharides and hydroxyalkyl amine.

22. The composition of claim 21 wherein the stabilizer is sorbitol.

23. The composition of claim 21 wherein the stabilizer is triethanol amine.

24. A method of fracturing a subterranean formation penetrated by a borehole, comprising injecting into the borehole and into contact with the formation, at a rate and pressure sufficient to fracture the formation, an alkaline fracturing fluid composition comprising:

(a) an aqueous hydrated galactomannan gum;

(b) a buffering agent effective to provide alkaline pH buffering at the effective crosslinking pH of the fluid, the buffering agent comprising a weak acid and a salt of said weak acid, in an amount sufficient to provide a pH of from about 9 to about 11 in the fluid, wherein the buffering agent is effective to reduce pH fluctuations as temperature is increased;

(c) a slurry capable of furnishing boron ions, borate ions, or mixtures thereof, in a solution for crosslinking said galactomannan gum; and (d) the well treating fluid being effective at reduced concentration levels of galactomannan gum comprising from about 10 to about 30 pounds of aqueous hydrated galactomannan gum per 1000 gallons of fluid;

(e) the fluid being effective to delay release of boron ions, borate ions, or mixtures thereof while facilitating a sufficiently elevated concentration level of boron ions, borate ions, or mixtures thereof.

25. A well treating fluid, comprising:

(a) an aqueous hydrated galactomannan gum;

(b) a buffering agent effective to provide alkaline buffering at the effective crosslinking pH of the fluid, the buffering agent comprising a weak acid and a salt of said weak acid, the weak acid and salt of said weak acid present in amounts that are effective, on a molar basis, to establish a buffer equilibrium in the fluid, further wherein the buffering agent is present in an amount sufficient to provide a controlled alkaline pH of from about 9 to about 11 in the fluid, the weak acid and salt of the weak acid being effective to resist pH change as a function of increasing temperature;

(c) a borate ion source capable of furnishing borate ions in solution for crosslinking said galactomannan gum;

(d) the well treating fluid being effective to crosslink and maintain fluid viscosity at reduced concentration levels of galactomannan gum comprising from about 10 to about 25 pounds of aqueous hydrated galactomannan gum per 1000 gallons of fluid;

(e) further wherein the fluid is effective to delay release of borate ions while facilitating a sufficiently elevated concentration level of borate ions during crosslinking.

26. The well treating fluid of claim 25 wherein at least one component of the buffering agent is selected from ammonium, potassium, and sodium carbonates, bicarbonates, sesquicarbonates, and hydrogen phosphates.

27. The fluid of claim 26 in which the buffering agent is formed by adding sodium sesquicarbonate and sodium carbonate in ratios between about 3:1 and 1:3.

28. The fluid of claim 26 in which the buffering agent is formed by adding sodium bicarbonate and sodium carbonate in ratios between about 1:2 and 2:1, the total amount of added carbonate and/or bicarbonate being treater than about 8 lbs/1000 gallons.

29. The fluid of claim 26 wherein the final bottomhole temperature is significantly greater than about 130 degrees F, the buffering agent being effective to resist pH changes as the temperature of the fluid advances above about 130 degrees F.

30. The fluid of claim 26 in which the buffering agent is formed by adding sodium bicarbonate or sodium carbonate in amounts that are effective to adequately resist pH chances in the fluid by providing actual chemical buffering at temperatures above about 150 degrees F.

* * * * *